United States Patent
Fukute

(10) Patent No.: US 7,295,148 B2
(45) Date of Patent: Nov. 13, 2007

(54) RADAR SYSTEM WITH RCS CORRECTION

(75) Inventor: Ryuji Fukute, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 324 days.

(21) Appl. No.: 10/974,846

(22) Filed: Oct. 28, 2004

(65) Prior Publication Data
US 2005/0093736 A1   May 5, 2005

(30) Foreign Application Priority Data
Oct. 31, 2003   (JP) .............................. 2003-371415

(51) Int. Cl.
  *G01S 7/40*   (2006.01)
  *G01S 13/93*   (2006.01)
(52) U.S. Cl. .................. 342/70; 342/89; 342/107; 342/174; 342/193
(58) Field of Classification Search .................. 342/70
  See application file for complete search history.

(56) References Cited

U.S. PATENT DOCUMENTS

| 3,781,883 A | 12/1973 | Effinger et al. |
| 4,324,258 A * | 4/1982 | Huebscher et al. ......... 600/455 |
| 4,672,380 A | 6/1987 | Bryant et al. |
| 5,691,724 A * | 11/1997 | Aker et al. .................. 342/104 |
| 6,466,629 B1 * | 10/2002 | Isaksson et al. ............ 375/316 |
| 2002/0080062 A1 | 6/2002 | Aker |
| 2004/0174926 A1* | 9/2004 | Shinde ....................... 375/141 |

FOREIGN PATENT DOCUMENTS

| JP | 63244934 A | * 10/1988 |
| JP | A-2-27283 | 1/1990 |
| JP | 9-68571 | 3/1997 |

* cited by examiner

*Primary Examiner*—Thomas H. Tarcza
*Assistant Examiner*—Matthew M Barker
(74) *Attorney, Agent, or Firm*—Crowell & Moring LLP

(57) ABSTRACT

There is provided a radar system having an input amplitude correcting function in which even when a large reflection wave exceeding a dynamic range of an A/D converter is inputted, an RCS calculation without a time lag can be executed at high precision, high reliability, and low costs without using power amplification degree control such as an AGC circuit or the like. Harmonic peaks of each target peak of an FFT-processed frequency spectrum are detected. When the harmonics are detected, it is determined that the large reflection wave exceeding the dynamic range of the A/D converter has been inputted, and a lost input amplitude is corrected in accordance with a correction table showing a relation between the harmonic order and an input amplitude correction amount which have previously been recorded.

4 Claims, 8 Drawing Sheets

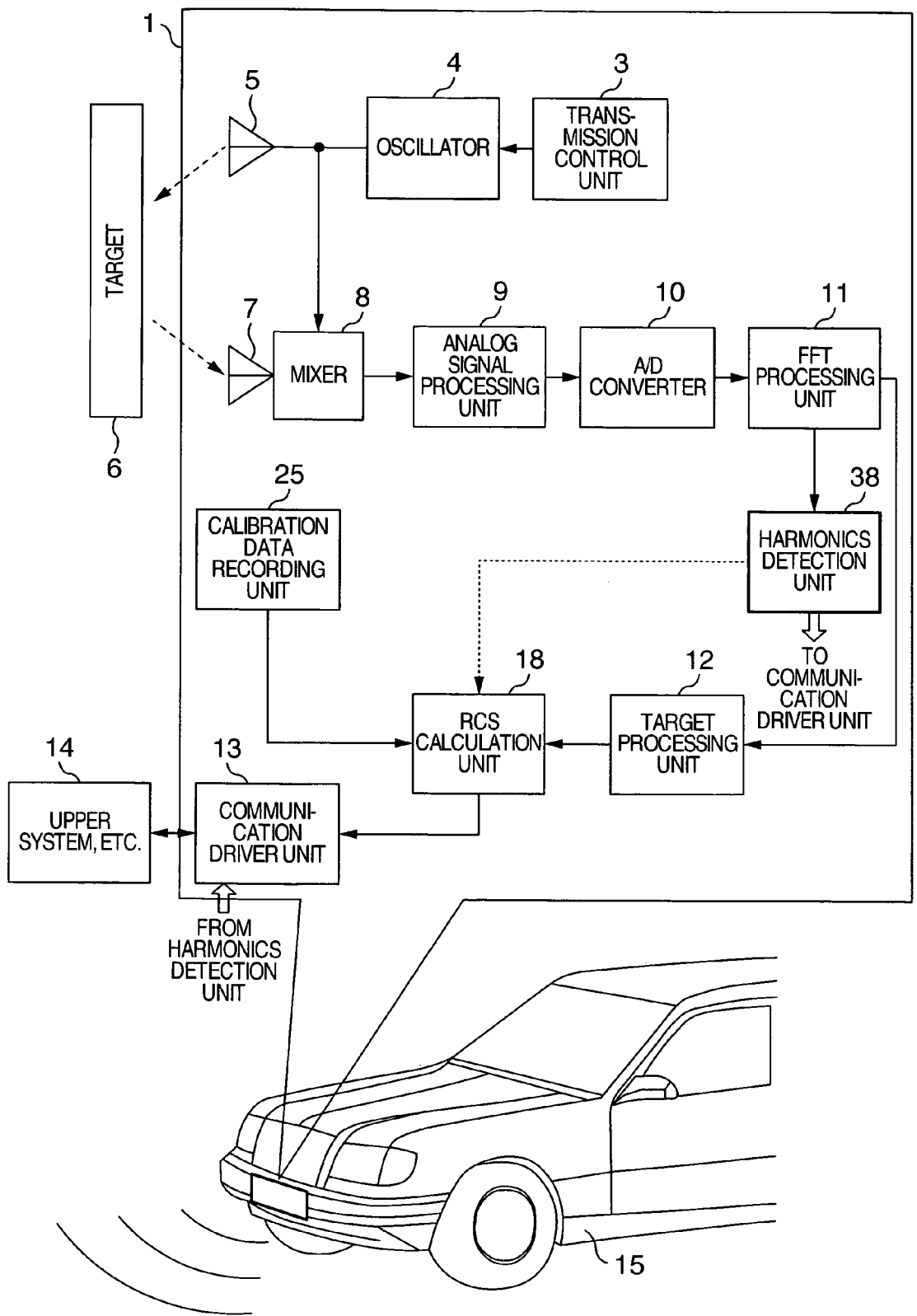

RADAR SYSTEM WITH RCS CORRECTION

BACKGROUND OF THE INVENTION

1. Field of the Invention

The invention relates to a radar system, a signal processing apparatus for the radar system, and a signal processing method for the radar system.

2. Description of the Related Art

It is known that a reception power from a target existing at a distance R is proportional to a radar cross section RCS of the target and inversely proportional to the fourth power of the distance to the target. Therefore, the RCS of the target can be calculated with the power received from the target and the distance to the target. An RCS value is an index of easiness of reflection of a radio wave. It is generally known that the larger the RCS value is, the larger the target is, although it is influenced by a shape and a material. That is, the calculated RCS value is one of important indices to decide a degree of importance and a degree of danger of the target. Particularly, it is important information when the system is applied to pre-crash safety or the like using a vehicle-mounted radar system.

However, there is such a problem that when a reception signal from the target exceeds a dynamic (input voltage) range of an A/D converter, the reception signal is clamped, harmonics appear in an FFT waveform, inherent target peak strength of fundamental wave appears to be small, and the RCS value cannot be properly calculated. Even if the harmonics appear, they do not (fundamentally) affect the measurement of the distance to the target and a relative velocity. The problem is that the peak strength seems to be small and it also makes the RCS value to seem small. Such a problem can occur when the RCS of the target is large or when the distance to the target is short. To solve such a problem, for example, in JP-A-2-27283, there is disclosed a system in which an AGC (Auto Gain Controller) circuit is provided in an amplifier disposed between a receiving antenna and an A/D converter and when a large reception signal is inputted, an amplification gain is suppressed, thereby preventing an input signal from exceeding the dynamic (input voltage) range of the A/D converter.

In the case of using the above conventional system, when a large reflection power from a certain target is received, the gain is suppressed by the AGC so that the input signal does not exceed the dynamic (input voltage) range of the A/D converter. However, there is such a problem that since the gain of the whole reception wave decreases, when a target peak of the small reception power exists at the same time, a sufficient amplification degree cannot be obtained, the target peak is below a noise floor, and there is a possibility that the target peak cannot be detected.

SUMMARY OF THE INVENTION

It is an object of the invention to provide a radar system which can calculate target information at high precision.

An input of a reflection wave whose strength exceeds a dynamic (input voltage) range of an A/D converter of a radar system to the A/D converter is detected and input amplitude information is corrected in accordance with the strength.

According to the invention, a radar system which can calculate an RCS at high precision can be provided.

Other objects, features and advantages of the invention will become apparent from the following description of the embodiments of the invention taken in conjunction with the accompanying drawings.

BRIEF DESCRIPTION OF THE DRAWINGS

FIG. 6 is a block diagram showing an embodiment of the radar system of the invention;

DETAILED DESCRIPTION OF THE EMBODIMENTS

An embodiment in which the invention is applied to an analog signal processing circuit of a radar system 1 of a dual-tone CW (Continuous Wave) (FSK: Frequency Shift Keying) type will be described hereinbelow with reference to FIGS. 1 to 8.

Figure 1:
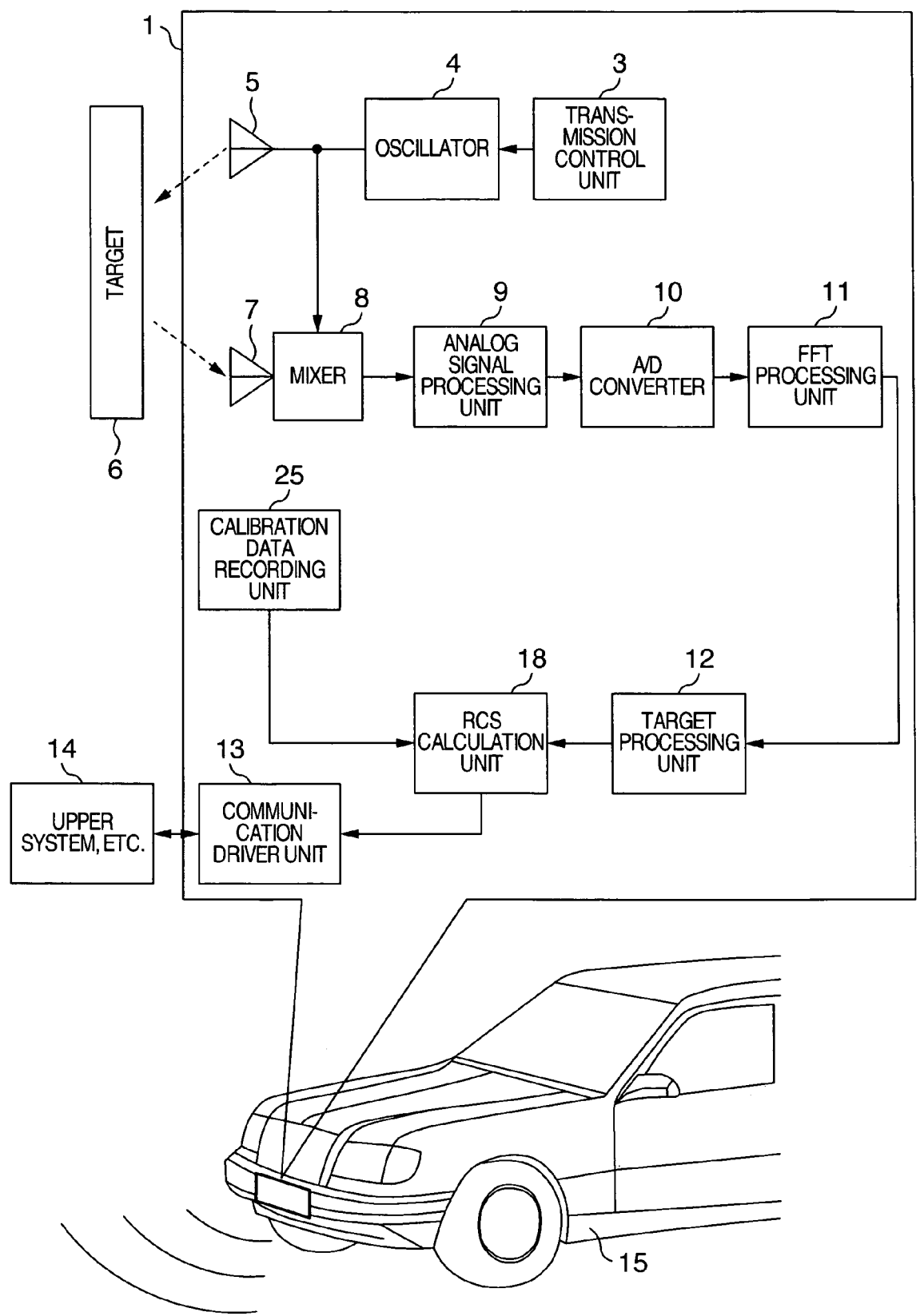
FIG. 1 is a block diagram showing an example of a construction of a radar system.

First, an outline of a milli-meter wave radar will be explained with reference to FIG. 1. The radar system 1 is often attached to a front side of a host vehicle 15. An outline of a measurement principle of the milli-meter wave radar will be explained.

First, a modulation signal for switching the dual-tone is formed by a transmission control unit 3 and an electromagnetic wave of a milli-meter wave band formed by an oscillator 4 on the basis of the modulation signal is transmitted frontward of the host vehicle 15 from a transmitting antenna 5. A radio wave reflected from a front-running vehicle, an obstacle along a road, a pedestrian, or the like (hereinafter, referred to as a target 6) is received by a receiving antenna 7 and mixed with the transmission wave by a mixer 8, thereby frequency-converting it from the milli-meter wave frequency band into an IF (Intermediate Frequency band). A beat signal extracted by the mixer is amplified by an analog signal processing unit 9. The amplified beat signal is converted into a digital signal by an A/D converter 10 and FFT-processed by an FFT (Fast Fourier Transform) processing unit 11, so that a target peak is obtained. Detailed processing contents of the analog signal processing unit 9, A/D converter 10, and FFT processing unit 11 will be described hereinafter. The obtained target peak is signal-processed by a target processing unit 12 and a relative velocity, a distance, and an angle of direction (hereinafter, referred to as target information) are calculated. An explanation of signal processing contents of the target processing unit 12 is omitted. Subsequently, the RCS is calculated in an RCS calculation unit 18 by using the peak strength of the target peak, the distance to the target 6 calculated in the target processing unit 12, and a radar constant (A) recorded in a calibration data recording unit 25. A detailed calculating method of the RCS will be explained hereinafter. The calculated RCS and the target information are transmitted to an upper system 14 or the like such as ACC (Adaptive Cruise Control) unit, a collision warning system unit, and the like through a communication driver unit 13 and used for controlling the vehicle and controlling a warning to the operator.

The detailed processing contents of the analog signal processing unit 9, A/D converter 10, and FFT processing unit 11 will now be described with reference to FIGS. 2 and 3A to 3C.

Figure 2:
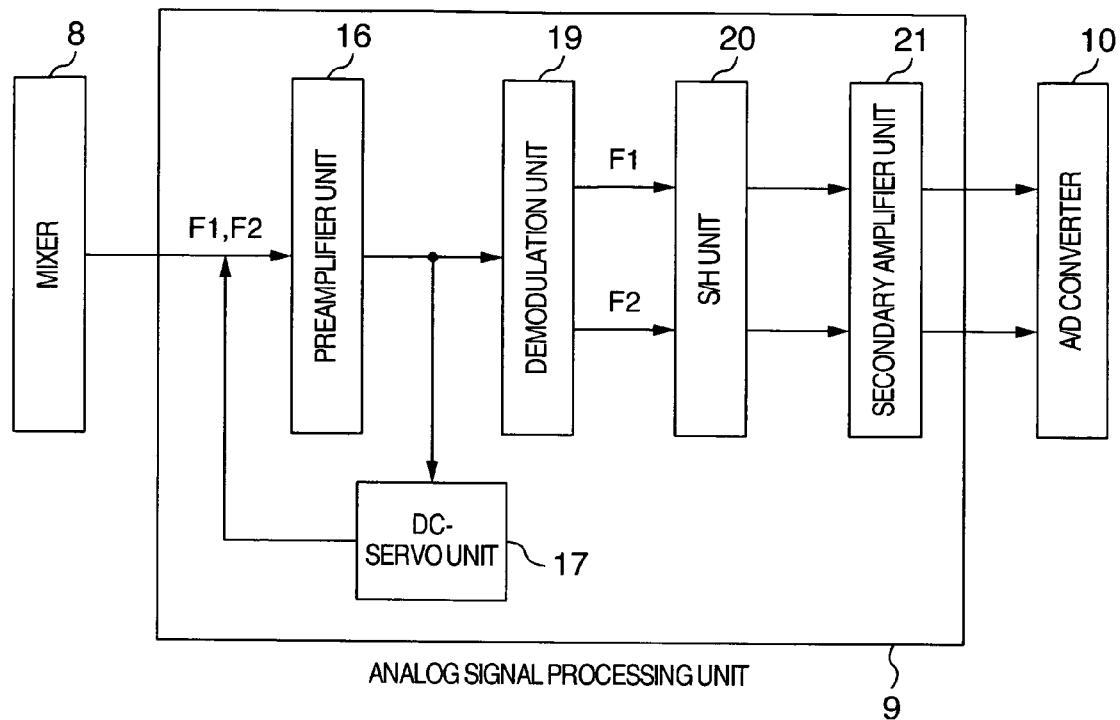
FIG. 2 is a diagram showing an example of a construction of an analog signal processing unit of the radar system.

FIG. 2 shows a construction of the analog signal processing unit 9. In FIG. 2, the analog signal processing unit 9 is constructed by a preamplifier unit 16, a DC-servo unit 17, a demodulation unit 19, an S/H (Sample & Hold) unit 20, and a secondary amplifier unit 21. The beat signal inputted from the mixer 8 is amplified by the preamplifier unit 16. The DC-servo unit 17 functions to cancel a DC offset of the beat signal. Since beat signals (F1, F2) of different phases corresponding to two transmitting frequencies (CF1, CF2) which were modulated upon transmission have been superposed to the amplified signal, those signals are demodulated in the demodulation unit 19. The demodulated two kinds of beat signals are sampled and held in the S/H unit 20, again amplified in the secondary amplifier unit 21, and thereafter, outputted to the A/D converter 10.

Figure 3A:
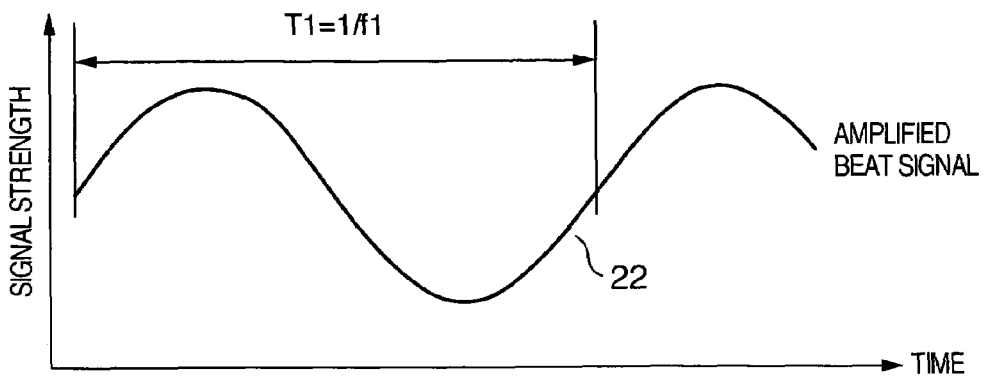
FIGS. 3A to 3C are diagrams showing A/D sampling data and FFT processing results of the radar system.
Figure 3B:
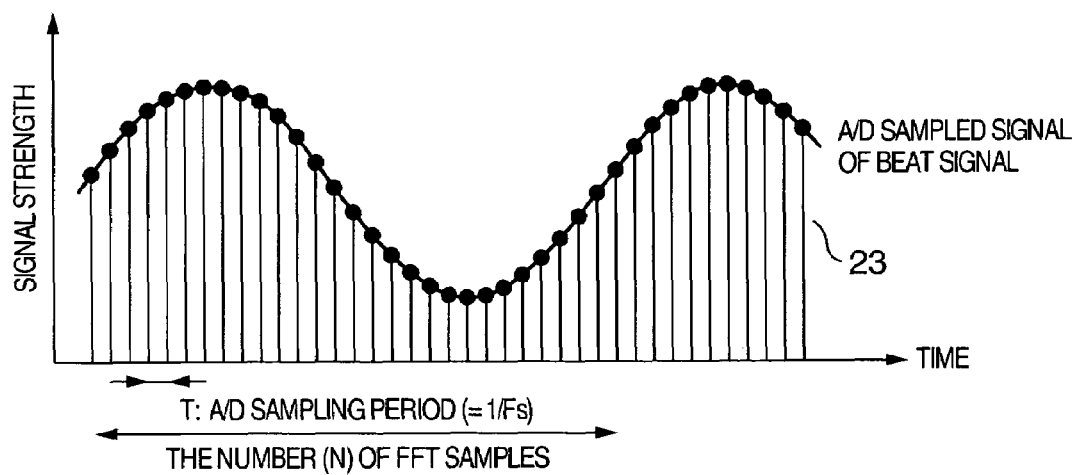
Figure 3C:
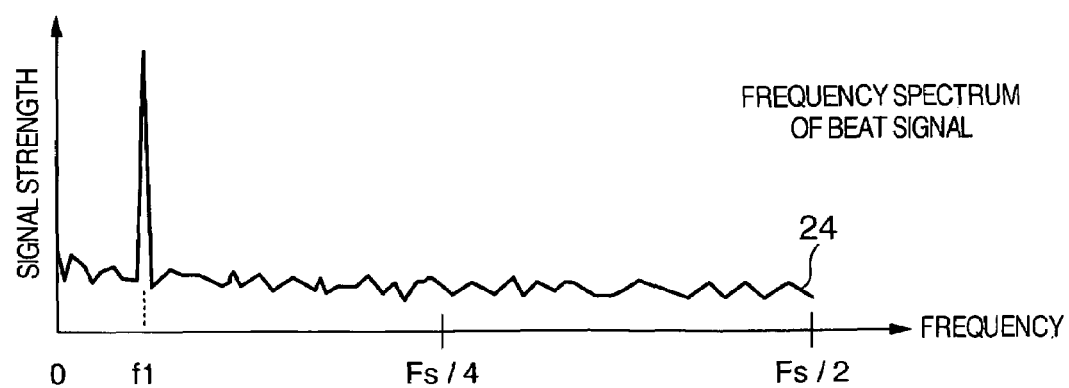

FIGS. 3A to 3C are diagrams showing processes which are executed to the reception signal by the analog signal processing unit 9, A/D converter 10, and FFT processing unit 11.

First, a beat signal 22 amplified in the secondary amplifier unit 21 of the analog signal processing unit 9 has a waveform as shown in FIG. 3A. The amplified beat signal 22 is sampled in the A/D converter 10 at an A/D sampling frequency Fs [Hz] (A/D sampling period T [sec]=1/Fs), so that a sampled signal 23 as shown in FIG. 3B is obtained.

Subsequently, the sampled signal 23 is FFT-processed by the FFT processing unit 11 by setting the number (N) of FFT samples to one frame, so that a frequency spectrum 24 of the beat signal 22 as shown in FIG. 3C in which an upper limit of the frequency is set to Fs/2 [Hz] is obtained.

Although the input signal is assumed to be a sine wave of a frequency f1 for simplicity of explanation, even the input signal including a plurality of frequency components can be separated into frequency peaks so long as they are away by resolution Fs/2·N [Hz] or more of the FFT from each other and the frequencies are smaller than Fs/2.

The conventional RCS calculating method will now be described. First, a radar equation as a fundamental theory of the reception power of the radar will be described. The radar equation is expressed by the following equation (1).

$$Pr = \frac{Pt \cdot Gt \cdot Gr \cdot \lambda^2 \cdot \sigma}{(4\pi)^3 R^4} \quad (1)$$

where,
Pr: reception power from the target 6
σ: RCS of the target 6
R: distance to the target 6
Pt: transmission power of the radar
Gt: gain of the transmitting antenna
Gr: gain of the receiving antenna
λ: wavelength of the transmission wave It will be understood from the equation (1) that the reception power Pr from a certain target 6 is proportional to the RCS value σ of the target 6 and inversely proportional to the fourth power of the distance R to the target 6. Target peak strength $S_T$ after the FFT process is expressed by the following equation (2) by substituting a conversion gain (loss) $G_C$ in the mixer 8, a gain $G_A$ in the analog signal processing unit 9, and an FFT coefficient $C_F$ in the FFT processing unit 11 into the equation (1).

$$S_T = \frac{Pt \cdot Gt \cdot Gr \cdot Gc \cdot G_A \cdot \lambda^2 \cdot C_F \cdot \sigma}{(4\pi)^3 R^4} = A \frac{\sigma}{R^4} \quad (2)$$

where,
A: radar constant expressed by the following equation (3) and it is set to a value which is peculiar to the radar and is not influenced by an external environment $$A = \frac{Pt \cdot Gt \cdot Gr \cdot Gc \cdot G_A \cdot \lambda^2 \cdot C_F}{(4\pi)^3} \quad (3)$$

From the equation (2), the RCS value σ of the target 6 is given by the following equation (4). If the AGC circuit exists in the analog signal processing unit 9, $G_A$ changes depending on a magnitude of the reception power and $S_T$ also changes in association with it. Therefore, when σ is calculated, it is corrected for an amount of such a change.

$$\sigma = \frac{S_T \cdot R^4}{A} \quad (4)$$

First, the peak strength $S_T$ from the target which exists at a known distance R' and has a known RCS value σ' is obtained and the radar constant (A) is calculated by the following equation (5) and recorded into the calibration data recording unit 25.

$$A = \frac{S_T \cdot R'^4}{\sigma'} \quad (5)$$

Thus, the RCS of the target 6 can be calculated by the equation (4) by using the target peak strength $S_T$ according to the actual target, the distance R to the target, and the radar constant (A) mentioned above.

The operation of the radar system in the case where the reception power exceeds the dynamic (input voltage) range of the A/D converter will now be described with reference to FIGS. 4A to 4C. It is assumed here that an input signal 26 is a sine wave of the frequency f1 for simplicity of explanation.

Figure 4A:
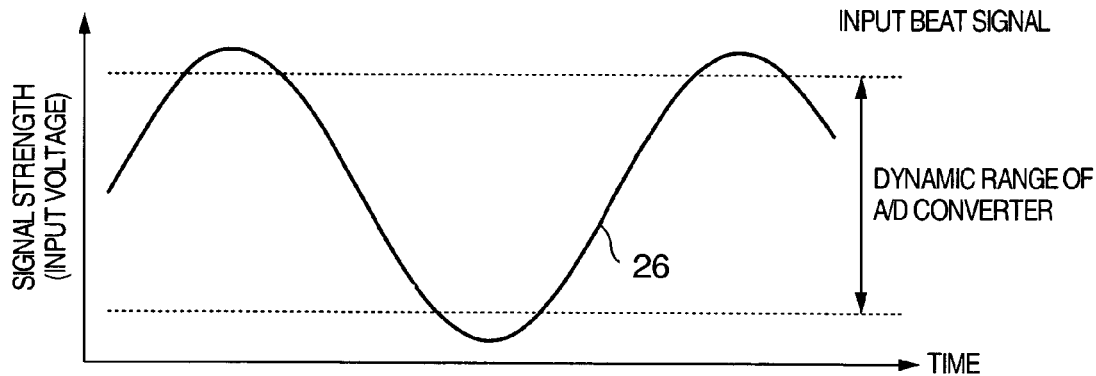
FIGS. 4A to 4C are diagrams showing A/D sampling data and FFT processing results in the case where a signal which exceeds a dynamic (input voltage) range of an A/D converter has been inputted to the radar system.
Figure 4B:
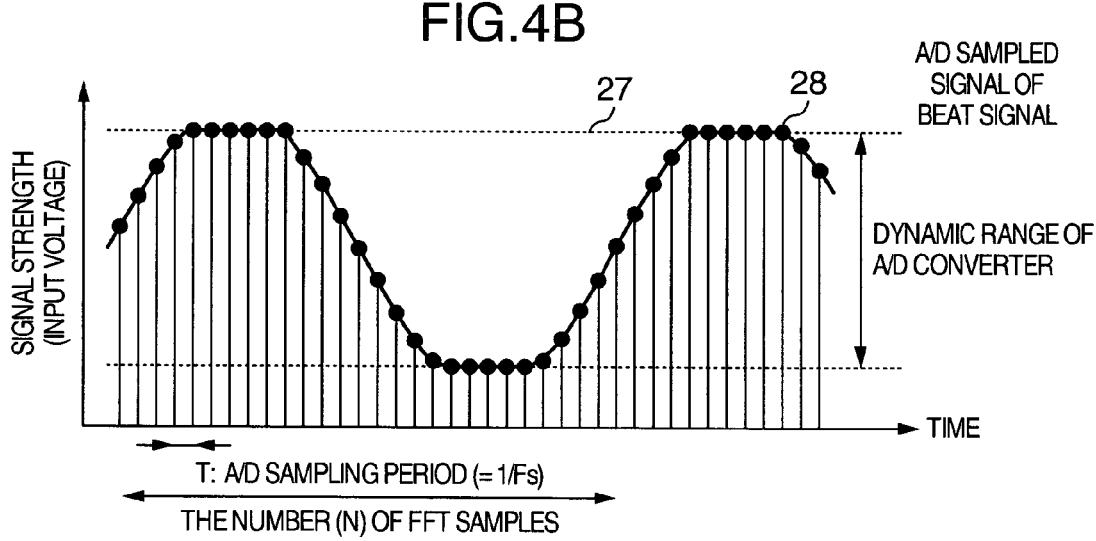

When the input signal 26 of the sine wave exceeding the dynamic (input voltage) range of the A/D converter as shown in FIG. 4A is inputted, the portion exceeding the dynamic (input voltage) range is clamped at maximum input voltage 27, so that a sampled signal 28 of the A/D converter becomes as shown in FIG. 4B.

Figure 4C:
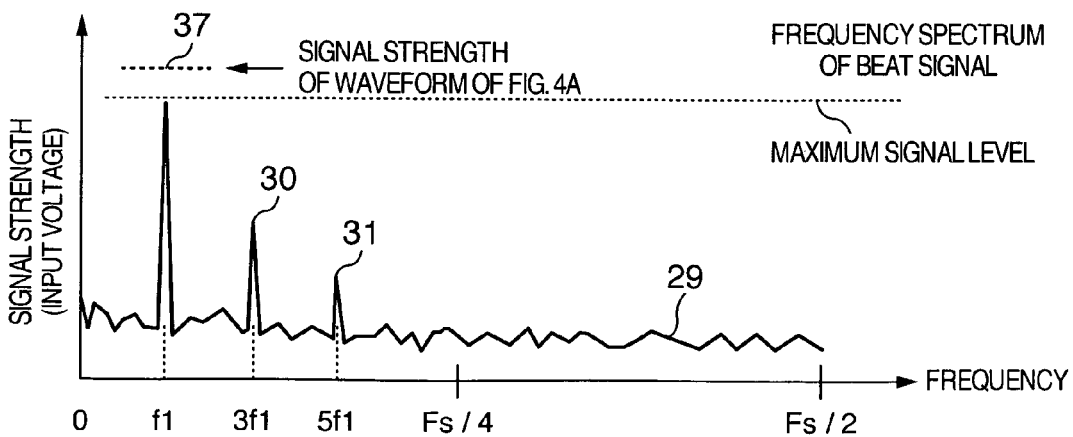

Thus, an FFT-processed frequency spectrum 29 becomes as shown in FIG. 4C. Although a target peak should appear inherently only in a position corresponding to the frequency f1, a third harmonic 30 appears in a position corresponding to (3×f1) and a fifth harmonic 31 appears in a position corresponding to (5×f1), . . . .

Since the sampled signal 28 has been clamped, the inherent target peak strength of fundamental wave $S_T$ is calculated to seem lower than inherent target peak strength 37. Since the target peak strength $S_T$ is obtained to be small, the RCS which is calculated by the equation (4) also decreases by such an amount and the target 6 is recognized to be a target whose reflection is smaller than the actual reflection. A change amount of the target peak strength $S_T$ at this time is proportional to the order of the harmonic which is detected. The changes in this case are shown in FIGS. 5A and 5B.

Figure 5A:
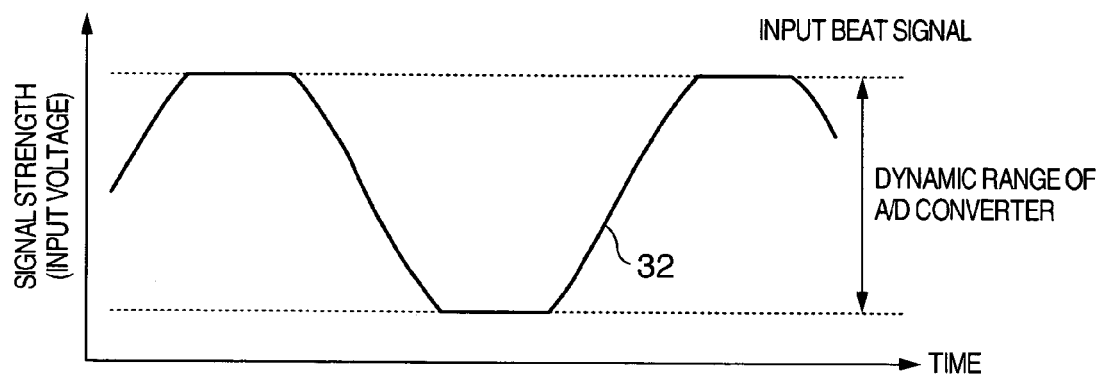
FIGS. 5A and 5B are diagrams showing relations between a magnitude of the input signal and a frequency component included therein.
Figure 5B:
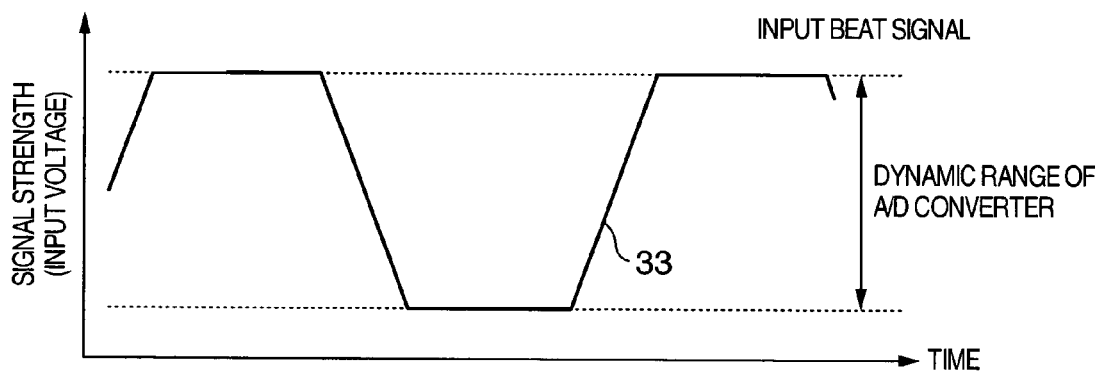

FIG. 5A shows an input signal waveform 32 in the case where the input signal strength is larger than the dynamic input voltage range by about 10%. FIG. 5B shows an input signal waveform 33 in the case where the input signal strength is larger than the dynamic (input voltage) range by about 100%. The waveform of FIG. 5B is closer to a rectangular wave than that of FIG. 5A and includes harmonic components of higher orders. Therefore, it will be understood that the higher the maximum order of the harmonic which is detected is, the larger the strength of the inherent input signal waveform is. By using such characteristics, an input amplitude is corrected and the target information can be precisely obtained. Details of a correcting method will be explained hereinafter. A correction amount of the input amplitude can be uniquely determined by the order of the harmonic of the FFT waveform.

Figure 8:
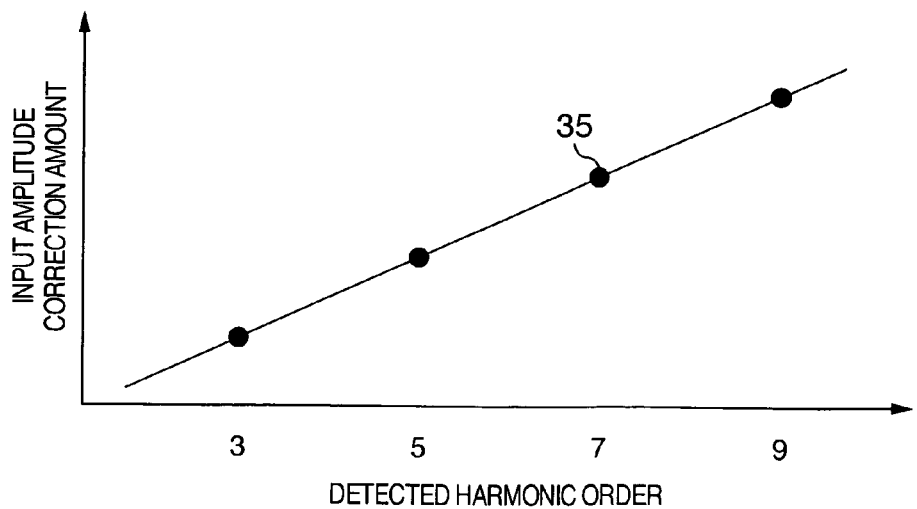
FIG. 8 is a correction table showing a relation between a harmonic order and an input amplitude correction amount.

Embodiments of a radar system using the method of the invention will now be described with reference to FIGS. 6 to 8.

First, FIG. 6 is a block diagram showing an embodiment of the radar system 1 using the invention. FIG. 6 differs from FIG. 1 in a point that the radar system of FIG. 6 has a harmonics detection unit 38 for searching for peaks corresponding to the frequencies of 3 times, 5 times, . . . of the frequency of each peak with respect to all target peaks in the spectrum which was FFT-processed in the FFT processing unit 11. When harmonics are detected, it is presumed that the beat signal has been clamped in the process in the A/D converter, the input signal has been lost, and an error has occurred in the digital signal which was inputted to the FFT processing unit 11 as described with reference to FIGS. 4A to 4C, 5A, and 5B.

As a countermeasure for the case where the harmonics are detected, such a construction that the fact that the error is included in the information measured by the radar is transmitted to the upper system 14 or the like by using the communication driver unit 13 is possible. According to this construction, for example, the upper system such as an ACC control unit for controlling the vehicle by using the information measured by the radar system 1 can be notified that the information measured by the radar system 1 is unreliable. Therefore, the control can be stopped on the upper system side or the operator can be given a warning. Such a construction that the communication with the upper system by the communication driver unit 13 is stopped is also possible. According to such a construction, since the information is not transmitted from the radar system 1 to the upper system 14, the upper system 14 can detect the occurrence of abnormality in the radar system 1 and take a necessary measure such as stop of the control, provision of a warning, or the like.

As another measure, such a construction that when harmonics are detected, the arithmetic operation of the RCS calculation unit 18 is stopped is also possible.

Figure 7:
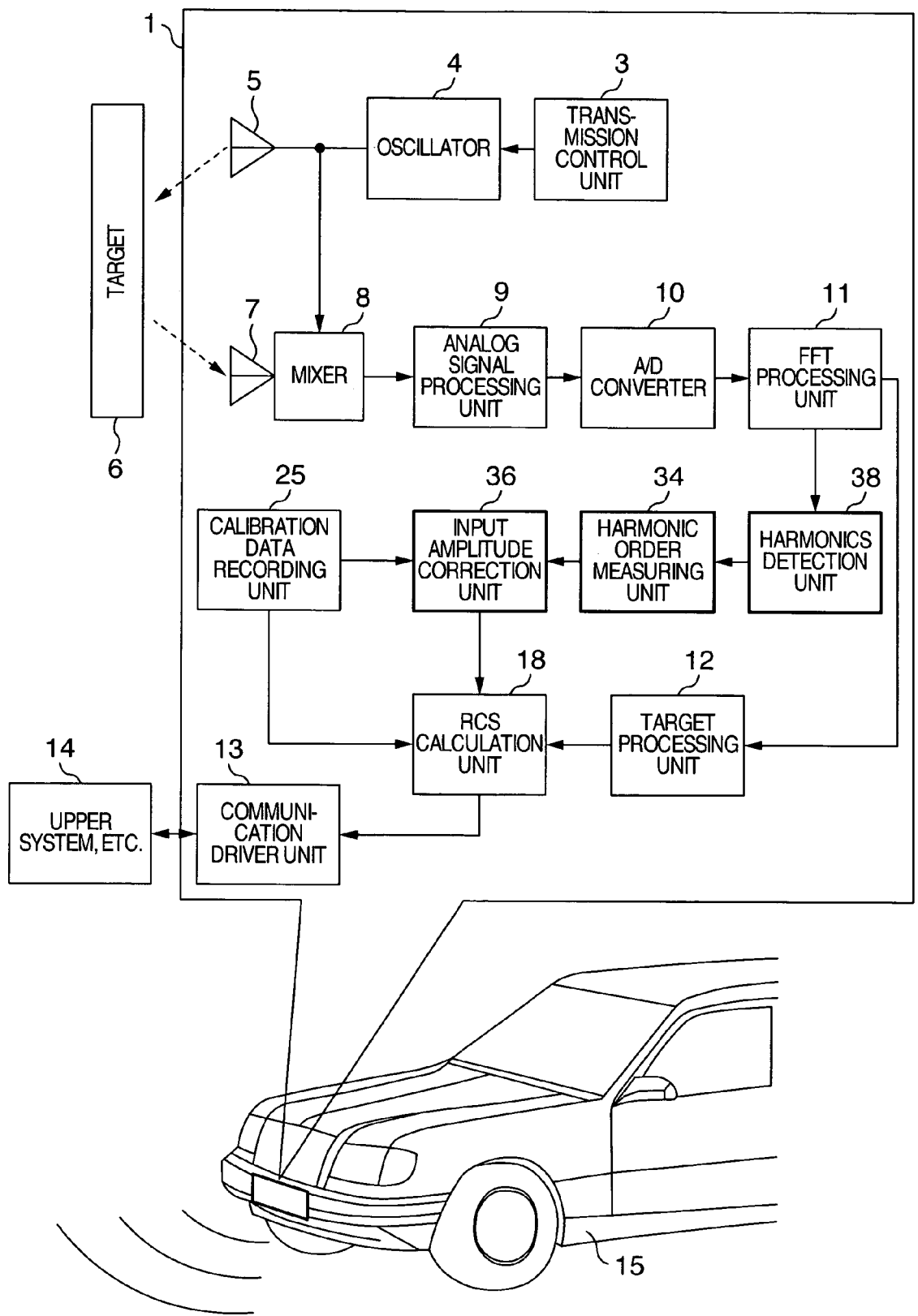
FIG. 7 is a block diagram showing another embodiment of the radar system of the invention.

FIG. 7 is a block diagram showing another embodiment of the radar system 1 using the invention. FIG. 7 differs from FIG. 1 in a point that the radar system there has a harmonic order measuring unit 34 for measuring the maximum order of the harmonics for the target peaks in the case where the harmonics detection unit 38 detects the harmonics for the target peaks and an input amplitude correction unit 36 for correcting amplitude information in accordance with the measured maximum order of the harmonics. On the basis of the corrected amplitude information, the target processing unit 12 calculates the target information and the RCS calculation unit 18 calculates the RCS.

Also in this embodiment, in a manner similar to the embodiment of FIG. 6, when the harmonics are detected, the stop of the control and the provision of the warning to the operator can be performed on the upper system side by using such a construction that the fact that the error is included in the information measured by the radar is transmitted to the upper system 14 or the like by using the communication driver unit 13, such a construction that the communication with the upper system by the communication driver unit 13 is stopped, or such a construction that the arithmetic operation of the RCS calculation unit 18 is stopped. The correction of the RCS is made by a method whereby a correction table 35 as shown in FIG. 8 showing a relation between the input amplitude correction amount and the order of the FFT-processed harmonics is recorded into the calibration data recording unit 25 and a correction value corresponding to the order of the detected harmonic is added to the input amplitude value.

Figure 9:
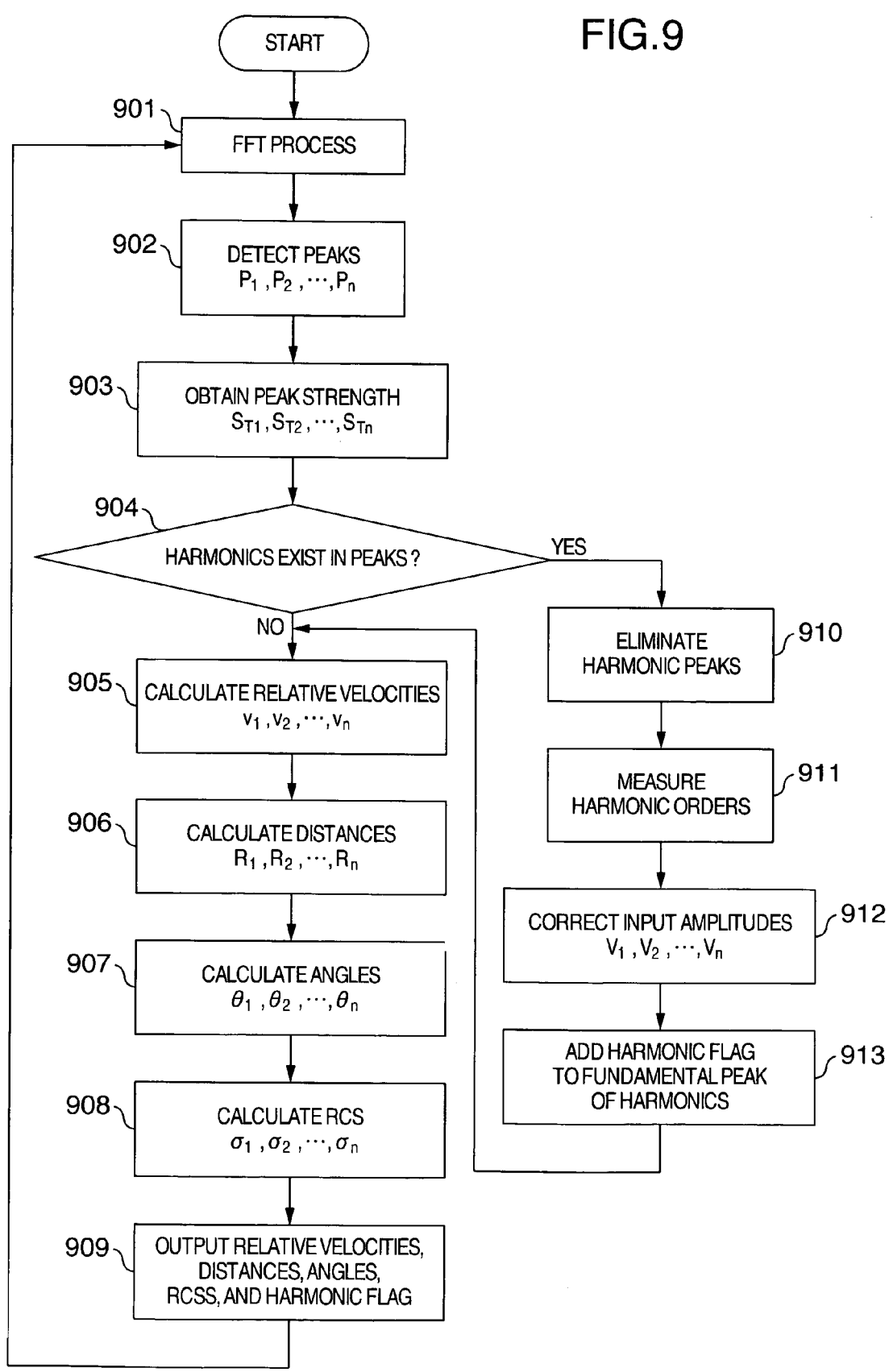
FIG. 9 is a flowchart for an RCS correcting process of the invention.

FIG. 9 is a flowchart showing an embodiment of the RCS calculation of the invention. First, the FFT process of the input signal is executed (step 901). All peaks of the FFT-processed frequency spectrum are detected (step 902). After that, peak strength of each peak is obtained (step 903). Subsequently, whether or not the harmonic peaks corresponding to the frequencies of 3 times, 5 times, . . . of the frequency of each peak exist is searched with respect to each peak (step 904). If such peaks do not exist, a relative velocity is calculated (step 905), a distance is calculated (step 906), an angle is calculated (step 907), and an RCS is calculated (step 908) with respect to each peak. The obtained target information is outputted to the upper system or the like (step 909).

When the harmonics exist, the peaks of the 3rd harmonic, the 5th harmonic, . . . are excluded (step 910). The orders of all of the harmonics are measured (step 911). The input amplitude is corrected with reference to the correction table (step 912). A harmonic flag showing that the RCS value is improper is added to the fundamental peak of the harmonics (step 913). After that, the target information and the RCS are calculated in a manner similar to the case where no harmonics exist and outputted together with the harmonic flag to the upper system or the like (step 909).

Although the embodiments of the invention have been described above, the invention is not limited to the above embodiments but many modifications are possible.

For example, although the embodiments have been described by using the milli-meter wave radar of the dual-tone CW (FSK) type, the invention is not limited to the modulating system of the radio wave but can be applied to radar of any system such as FMCW type or the like.

According to the invention as mentioned above, even in the case where the reception signal from the target exceeds the dynamic (input voltage) range of the A/D converter, the reception signal is clamped, and the harmonics appear in the FFT waveform, such a situation is detected and the input amplitude value can be corrected. Therefore, such a situation that the inherent target peak seems to be small and the RCS cannot be properly calculated can be avoided. Such a situation that the strength of the whole target peak decreases due to the AGC circuit and the target of the small receiving strength is below in the noise can be also avoided.

According to the invention, the following effects are also obtained.

According to the AGC circuit system, since it is necessary to add a reception power monitoring unit for monitoring and controlling the reception power and a power correction unit for correcting the gain change amount due to the AGC, there are problems such as deterioration of measuring precision of the power, deterioration of reliability, and increase in costs due to the addition of those units. According to the invention, however, since the RCS can be measured without using the AGC, there are such effects that the measuring precision of the reception power is improved, the reliability is improved, and the costs are reduced as compared with the conventional technique using the AGC.

Further, since a cause of a time lag due to the switching of the gain cannot be avoided in the conventional AGC circuit system, a delay of the RCS calculation due to the time lag becomes a problem when the system is applied to the pre-crash safety or the like using the vehicle-mounted radar system. According to the invention, however, there are such effects that the RCS calculation at high precision, high reliability, low costs, and a shorter time lag can be realized without using power amplification degree control by the AGC circuit or the like.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A radar system comprising:
    an analog circuit which emits a radio wave from a transmitting antenna, receives a reflection wave from a target, and signal-processes said reflection wave;
    an A/D converter which converts an output signal of said analog circuit into a signal in a digital form; and
    a digital circuit which processes the converted signal in the digital form; wherein,
    said system further comprises detection means for detecting that a large reflection wave whose strength exceeds a dynamic range of said A/D converter has been inputted to said A/D converter;
    said digital circuit has a function which calculates target information from amplitude information which is inputted; and
    said target information is corrected on the basis of a detection result of said detection means.

2. The radar system according to claim 1, wherein the target information which is calculated is a radar cross section (RCS) showing easiness of the reflection of the radio wave of the target.

3. A radar system comprising:
    an analog circuit which emits a radio wave from a transmitting antenna, receives a reflection wave from a target, and signal-processes said reflection wave;
    an A/D converter which converts an output signal of said analog circuit into a signal in a digital form; and
    a digital circuit which processes the converted signal in the digital form;
    wherein said system further comprises,
    detection means for detecting that a large reflection wave whose strength exceeds a dynamic range of said A/D converter has been inputted to said A/D converter;
    an FFT processing unit which FFT-processes the digital signal; and
    a harmonics detection unit which detects harmonic peaks of each target peak of a frequency spectrum after the FFT process, and when harmonics are detected, determines that a large reflection wave exceeding the dynamic range of said A/D converter has been inputted.

4. The radar system according to claim 3, further comprising:
    a maximum order measuring unit which measures a maximum order of the harmonic of each target peak of said frequency spectrum;
    a calibration data recording unit which holds a correction table showing a relation between said harmonic order and an input amplitude correction amount; and
    an input amplitude correction unit which corrects input amplitude information lost in said A/D converter on the basis of said correction table.

* * * * *